US008087044B2

(12) United States Patent
Krause et al.

(10) Patent No.: US 8,087,044 B2
(45) Date of Patent: Dec. 27, 2011

(54) METHODS, APPARATUS, AND SYSTEMS FOR MANAGING THE INSERTION OF OVERLAY CONTENT INTO A VIDEO SIGNAL

(75) Inventors: Edward A. Krause, San Mateo, CA (US); Charlie X. Yang, Sunnyvale, CA (US); Anesh Sharma, Santa Clara, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 736 days.

(21) Appl. No.: 11/881,208

(22) Filed: Jul. 25, 2007

(65) Prior Publication Data
US 2008/0068507 A1 Mar. 20, 2008

Related U.S. Application Data

(60) Provisional application No. 60/845,707, filed on Sep. 18, 2006.

(51) Int. Cl.
*H04N 7/10* (2006.01)
*H04N 7/025* (2006.01)

(52) U.S. Cl. .............. 725/35; 725/32; 725/33; 725/34; 725/36

(58) Field of Classification Search .............. 725/32–36
See application file for complete search history.

(56) References Cited

U.S. PATENT DOCUMENTS

| | | | |
|---|---|---|---|
| 5,264,933 A * | 11/1993 | Rosser et al. ............... | 348/578 |
| 5,870,087 A | 2/1999 | Chau | |
| 5,969,768 A | 10/1999 | Boyce et al. | |
| 6,061,099 A | 5/2000 | Hostetler | |
| 6,097,442 A | 8/2000 | Rumreich et al. | |
| 6,175,388 B1 | 1/2001 | Knox et al. | |
| 6,226,328 B1 | 5/2001 | Assuncao | |
| 6,275,536 B1 | 8/2001 | Chen et al. | |
| 6,295,094 B1 | 9/2001 | Cuccia | |
| 6,310,657 B1 | 10/2001 | Chauvel et al. | |
| 6,434,197 B1 | 8/2002 | Wang et al. | |
| 6,727,886 B1 | 4/2004 | Mielekamp et al. | |
| 6,850,252 B1 | 2/2005 | Hoffberg | |
| 7,046,677 B2 | 5/2006 | Monta et al. | |

(Continued)

OTHER PUBLICATIONS

Leon, Orlando, 'An Extensible Communication-Oriented Routing Environment for Pervasive Computing', Massachusetts Institute of Technology, Department of Electrical Engineering and Computer Science, Masters Thesis, May 24, 2002. [retrieved on Feb. 15, 2003]. Retrieved from the Internet: <URL:http://org.csail.mit.edu/pubs/theses/leon/leon-thesis.pdf>.

*Primary Examiner* — Dominic D Saltarelli
(74) *Attorney, Agent, or Firm* — Lipsitz & McAllister, LLC (57) ABSTRACT

Methods, apparatus, and systems for managing the insertion of overlay content into a video signal are provided. A video signal is received from a video source. In addition, overlay content is provided in one or more overlay content signals. A tag is appended to the video signal and/or the overlay content signals. The tag contains identifying information. Overlay content selected from one of the overlay content signals may then be inserted into the video signal in accordance with the identifying information to produce a modified video content. The identifying information may comprises various types of information identifying the source or subject matter of the overlay content or video signal, the destination of the overlay content or video signal, information identifying the geographic region where the overlay content is to be inserted, or key words or other information to enable matching of the overlay content with an appropriate video signal.

34 Claims, 4 Drawing Sheets

U.S. PATENT DOCUMENTS

| | | |
|---|---|---|
| 7,324,161 B2 | 1/2008 | Hwang |
| 7,391,809 B2 | 6/2008 | Li et al. |
| 2002/0061184 A1 | 5/2002 | Miyamoto |
| 2002/0110193 A1 | 8/2002 | Yoo et al. |
| 2002/0112249 A1* | 8/2002 | Hendricks et al. ............ 725/136 |
| 2002/0176495 A1 | 11/2002 | Vetro et al. |
| 2002/0176508 A1 | 11/2002 | Boyce et al. |
| 2003/0220835 A1 | 11/2003 | Barnes, Jr. |
| 2004/0179597 A1 | 9/2004 | Rault |
| 2004/0252982 A1 | 12/2004 | Iwahara et al. |
| 2004/0268401 A1 | 12/2004 | Gray et al. |
| 2007/0250896 A1 | 10/2007 | Parker et al. |
| 2007/0297507 A1 | 12/2007 | Kim |
| 2008/0056354 A1 | 3/2008 | Sun et al. |

* cited by examiner

METHODS, APPARATUS, AND SYSTEMS FOR MANAGING THE INSERTION OF OVERLAY CONTENT INTO A VIDEO SIGNAL

This application claims the benefit of U.S. Provisional Application No. 60/845,707, filed Sep. 18, 2006, which is incorporated herein and made a part hereof by reference.

BACKGROUND

The present invention relates to the field of video processing. More particularly, the present invention provides methods, apparatus, and systems for managing the insertion of overlay content into a video signal. In addition, certain example embodiments of the invention are directed towards insertion of overlay content into a video signal during transrating of the video signal.

Today's television images are frequently overlayed with additional content (referred to herein as "overlay content"), such as text messages, logos, animations, or sub-windows featuring full-motion video. Such edited signals are useful for conveying emergency information, targeted advertisements, or for customizing the message associated with a full-screen program or advertisement. There may be more than one candidate overlay content available for insertion into a particular video stream at a particular time. Although equipment for inserting or overlaying new content into full-screen video is readily available, such equipment is typically designed to operate with uncompressed video signals, and is purpose-driven for only those applications.

Figure 1:
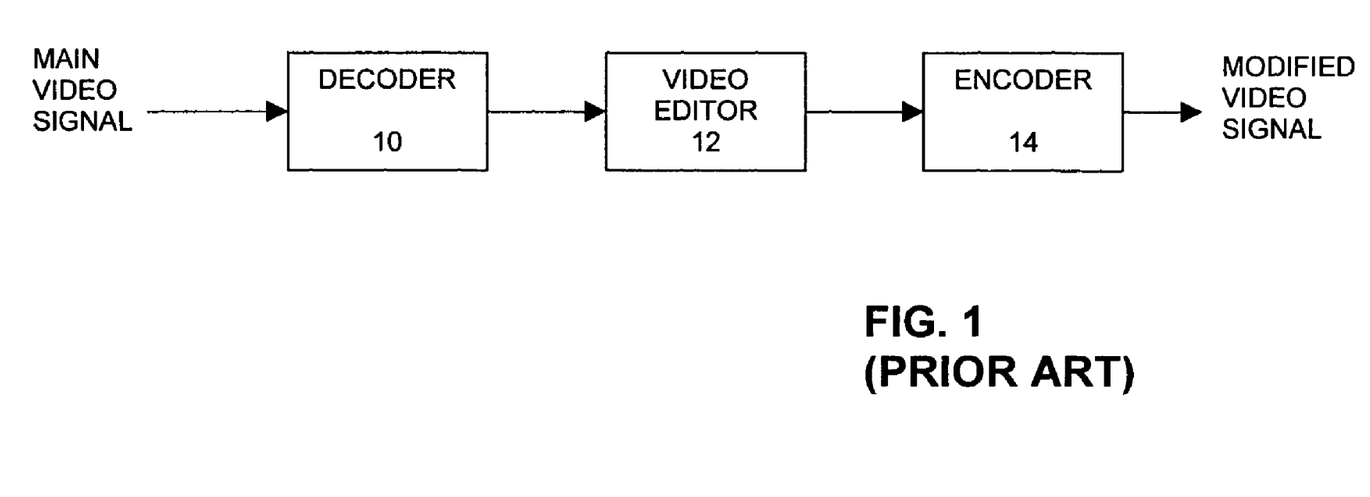
FIG. 1 shows a block diagram of a prior art system for inserting overlay content into a video signal.

Encoded video signals based on compression standards such as MPEG present special challenges to the video editing process. A prior art system for inserting overlay content into a video signal is shown in FIG. 1. In the prior art, a decoder 10 fully decodes the video signals before the overlay content (auxiliary video) is inserted at a video editor 12. The modified video signal from the video editor 12 is then re-encoded at encoder 14 before being forwarded to the final destination. Not only is this solution expensive, but it can also degrade the quality of the video. For example, it is not uncommon to choose an expensive high-quality encoder for the original encoding process, and then economize on the cost of additional hardware if needed to process the signal in the smaller cable head-ends or other distribution sites serving a more limited audience.

Although it is possible to directly modify the video signal without using separate decoders, editors, and encoders, multiple problems need to be solved. For example, compression standards such as MPEG-2 and H.264 use motion compensation to predict the movement of features from one video frame to another. However, if one of these frames is altered by inserting or overlaying a different video image, then the synchronization between the decoder and the original encoder is destroyed. As a result, the motion prediction process will fail if a region of the image is encoded using a motion vector which crosses the boundary between the modified and unmodified regions of the image.

It would be advantageous to provide a simplified way to manage the insertion of overlay content into a video signal. In particular, it would be advantageous to enable overlay content to be closely correlated with a video signal into which the overlay content is to be inserted and/or with a video signal in a particular geographic region. It would also be advantageous to enable such close correlation between the overlay content and the video signal using tags with identifying information appended to the overlay content and/or the video signals. It would be further advantageous to enable the modification of compressed video signals with overlay content without the use of decoders and encoders. This results in considerable cost savings particularly when a large number of streams need to be processed. In addition, it would be advantageous to enable modification of the compression ratio of the video signal using the same insertion and overlay apparatus.

The methods, apparatus, and systems of the present invention provide the foregoing and other advantages. In particular, the present invention is particularly advantageous when combined with advanced transrating systems, such as the statistical multiplexers used in cable and other video distribution centers.

SUMMARY OF THE INVENTION

The present invention provides methods, apparatus, and systems for managing the insertion of overlay content into a video signal.

In one example embodiment of the present invention, a video signal is received from a video source. In addition, overlay content is provided in one or more overlay content signals. A tag is appended to at least one of: (a) the video signal; and (b) at least one of the one or more overlay content signals. The tag contains identifying information. Overlay content selected from one of the one or more overlay content signals may then be inserted into the video signal in accordance with the identifying information to produce a modified video content.

In a further example embodiment, a tag may be appended to both the video signal and each of the one or more overlay content signals. The overlay content may be selected from one of the one or more overlay content signals by extracting the tags from the video signal and each of the one or more overlay content signals, comparing the tag from the video signal with each tag from the overlay content signals, and selecting for insertion the overlay content from the overlay content signal which has the tag that is a best match to the tag extracted from the video signal.

The identifying information may comprises at least one of: geographic information identifying the geographic region where the overlay content is to be inserted into the video signal; a downlink control device identifier; a destination QAM; a channel number; an insertion start time; a duration of overlay content; an insertion identifier; an insertion window position; an insertion window size; a classification identifier; blending information; key words to enable matching of the overlay content with the video signal; or the like.

The classification identifier may comprise at least one of subject information for the video signal, subject information for the overlay content, priority information for an existing insertion window, characteristics of an insertion window, audio override information for the overlay content, a resolution of the overlay content, a channel number, a target program name for insertion of the overlay content, a regional program rating of the target program, a transport identifier for the target program, a format descriptor, a text component descriptor comprising at least one of text position, speed, font size, font type, and font color, and a video component descriptor comprising at least one of a video resolution, a video position, a video speed for animation, or the like.

In a further example embodiment, a tag may be appended to both the video signal and each of the one or more overlay content signals. Classification identifiers may be provided as at least part of the identifying information. A corresponding quality of fit parameter may be assigned to the overlay content signal for each classification identifier. The quality of fit parameter may indicate a relative correspondence between each overlay content and the classification identifier. In such an example embodiment, the overlay content signals that have the same classification identifier as the video signal may be identified. The overlay content may then be selected from the identified overlay content signal that has a quality of fit parameter that indicates a highest correspondence to the classification identifier.

The overlay content signals may be generated at a central distribution site. The overlay content signals may be forwarded to at least one remote location for storage in advance of the inserting. The remote location may comprise one of a cable headend, a central office, a cable distribution hub, and a satellite distribution hub. In such instances, the identifying information may comprise geographic information and the overlay content signals having geographic information corresponding to a particular remote location may be selected for insertion at that particular remote location.

The selection and inserting of the overlay content may occur at the at least one remote location. Alternatively, the selection and inserting of the overlay content may occur at a central location. Multiple copies of the modified video content may then be distributed from the central location to one or more remote locations for further distribution.

The tag may be appended to the overlay content signal at the central distribution site. This tag may determine which of the one or more remote locations will insert the overlay content in a particular video stream.

The overlay content signal may be inserted into an insertion window of the video signal in place of a corresponding portion of the video signal. Alternatively, the overlay content may be inserted into an insertion window of the video signal and blended with a corresponding portion of the video signal.

Systems corresponding to the above-described methods are also encompassed by the present invention. One example embodiment of a system for inserting overlay content into a video signal comprises a network switch for receiving a video signal from a video source and an overlay generator for providing overlay content in one or more overlay content signals to the network switch. Tagging means are also provided for appending a tag containing identifying information to at least one of: (a) the video signal; and (b) at least one of the one or more overlay content signals. A video processor is provided which is in communication with the network switch. The video processor is adapted for selecting overlay content from one of the one or more overlay content signals and inserting the selected overlay content into the video signal in accordance with the identifying information to produce a modified video content.

The tagging means for the video signal may comprise a tagging processor for appending a tag to the video signal. The tagging means for the one or more overlay content signals may comprise the overlay generator, which may be adapted to append the tags to the one or more overlay content signals. Tags may be appended to the video signal and each of the one or more overlay content signals.

The video processor may comprise means for extracting the tags from the video signal and each of the one or more overlay content signals, means for comparing the tag from the video signal with each tag from the overlay content signals, and means for selecting for insertion the overlay content from the overlay content signal which has the tag that is a best match to the tag extracted from the video signal.

The identifying information may comprise a variety of information, including a classification identifier as discussed above.

In one example embodiment, the tagging processor may append tags to the video signal and each of the one or more overlay content signals. The identifying information may include a classification identifier. The overlay generator may assign a corresponding quality of fit parameter to the overlay content signal for each classification identifier. The quality of fit parameter may indicate a relative correspondence between each overlay content and the classification identifier. The video processor may identify the overlay content signals which have the same classification identifier as the video signal and may select the overlay content from the identified overlay content signal which has a quality of fit parameter that indicates a highest correspondence to the classification identifier.

The overlay generator may be located at a central distribution site. At least one video processor may be provided at a respective remote location. The overlay content signals may be forwarded to at least one remote location for storage in advance of the inserting. The identifying information may comprise geographic information. The video processor at a particular remote location may select the overlay content from the overlay content signals having geographic information corresponding to its particular remote location for insertion in the video signal. The tag may be appended to the overlay content signal at the central distribution site and may determine which of the one or more remote locations will insert the overlay content for insertion in a particular video stream.

An external source may trigger the insertion of the overlay content by the overlay generator. The external source may comprise, for example, an Emergency Alert System (EAS), an Ad Decision System (ADS), or other source.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 2:
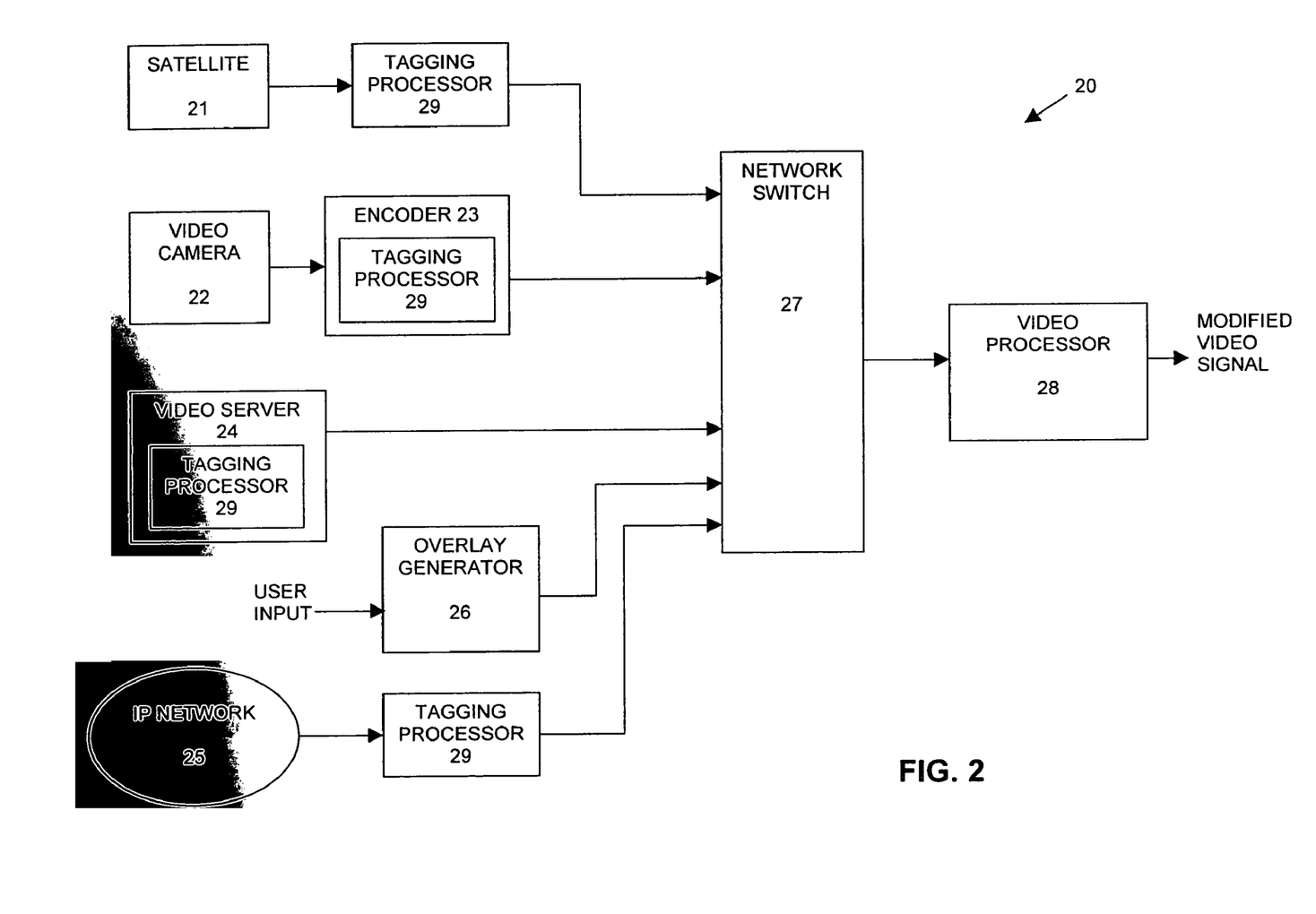
FIG. 2 shows a block diagram of an example embodiment of a system for inserting overlay content into a video signal in accordance with the present invention.

The present invention provides methods, apparatus, and systems for managing the insertion of messages or other video content into a main video signal. A simple block diagram of an example embodiment of a video processing system 20 with insertion and overlay capabilities in accordance with the present invention is shown in FIG. 2. In this example, video signals are received from one or more video sources, such as, for example, a satellite 21, a video camera 22 coupled to a video encoder 23, video storage devices/servers 24, an IP network 25, or the like. The overlay content signal to be inserted into the incoming video signals is created by an overlay content generator 26, for example using information provided from a console for user input (or from external sources as discussed below in connection with FIG. 4). As an example, the overlay content generator 26 and user console may be a PC installed with software for generating text, graphic features, or more general video content. In such an example, the PC may also include software or hardware for encoding the rendered video to a suitable compression format. The insertion or overlaying of content into the main video signal is implemented by a video processor 28 which receives the video signals and overlay content signals via a network switch 27 or other suitable mechanism.

In order to manage which overlay content is inserted into which video signal at the video processor 28, a tag is appended to at least one of: (a) the video signal; and (b) at least one of the one or more overlay content signals. The tag contains identifying information for use in matching overlay content to an appropriate video signal. The video processor 28 is then able to select overlay content from one of the overlay content signals and insert the selected overlay content into the video signal in accordance with the identifying information to produce a modified video content.

The tag may be appended to the overlay content signal by the overlay generator 26. A tag may be appended to each incoming video signal by a tagging processor 29 at the video source (e.g., at satellite 21, a video camera 22 coupled to a video encoder 23, video storage devices (servers) 24, or IP network 25). The tagging processor 29 may be implemented as part of the encoding device at the video source (e.g., as part of encoder 23 or video server 24) or as a separate device (e.g., downstream from IP network 25 or satellite 21).

The appended tags could be inserted into the headers of elementary video or audio streams or they could be multiplexed into a packetized stream consisting of multiple video, audio, and data streams corresponding to one or more programs. In this case, the header information could be encapsulated into one or more packets and assigned a unique packet identifier (PID). In the case of MPEG-2 transport streams, packets types and program correspondences are determined by matching these PIDs with entries listed in special packets known as Program Association Tables (PAT) and Program Map Tables (PMT) included in the same multiplexed stream.

In a further example embodiment, a tag may be appended to both the video signal and each of the one or more overlay content signals. The video processor 28 may select overlay content from one of the overlay content signals by extracting the tags from the video signal and each of the one or more overlay content signals, comparing the tag from the video signal with each tag from the overlay content signals, and selecting for insertion the overlay content from the overlay content signal which has the tag that is a best match to the tag extracted from the video signal.

The identifying information contained in the tag may comprise at least one of: geographic information identifying the geographic region where the overlay content is to be inserted into the video signal; a downlink control device identifier; a destination QAM; a channel number; an insertion start time; a duration of overlay content; an insertion identifier; an insertion window position; an insertion window size; a classification identifier; blending information; key words to enable matching of the overlay content with the video signal; or the like.

For example, a tag with an insertion identifier may be appended to the video signal and used to match the video signal with specific overlay content signal that the video processor 28 should have already received. The video processor 28 would identify this overlay content signal by matching keywords in the overlay content signal tag with the insertion identifier contained in the tag appended to the video signal.

Geographic information such as zip codes, a downlink control device IDs, destination QAMs, channel numbers, and the like may be included in the tags to enable better targeted insertion of overlay content, e.g., for advertisements. Content descriptors may also be included in the tags which may include at least one of format information (text, still picture, MPEG2, MPEG4 video, audio types, and the like) and corresponding component descriptors. In addition, text component descriptors may be provided which may include at least one of list position, speed, font, etc. Further, the tags may include video component descriptors which may include at least one of resolution, position, moving speed for animation, etc. Audio descriptors may be provided which may indicate a policy to replace main audio (which is usually not desired).

The blending information may comprise information to enable alpha blending of the overlay content with a corresponding portion of the video signal to obtain a modified video signal containing the overlay content.

The classification identifier may be used to assist the video processor 28 in selecting the most suitable overlay content to insert into a video signal at a particular time and position within the video signal or frame of the video signal. It is a parameter that could be interpreted as a subject classification pertaining to the video signal at the specified time, or it could be interpreted as a more general screening filter conveying information such as the priority of the existing window, the characteristics of the window background, a destination QAM, a destination channel, or a downlink control device. Note that overlay content may or may not include audio and the classification identifier could also specify whether it is permissible to override the audio provided with the main video stream.

The process of selecting a particular overlay content for insertion into a main video program could be implemented by first pre-assigning one or more classification identifiers to the tags for each available overlay content signal. Then, when an opportunity for insertion is signaled by tags in the main video streams, the classification identifier could be extracted from the tag in the main video program and compared with the one or more classification identifiers in each of the available overlay content signals. Any overlay content signal with a matching identifier would contain overlay content suitable for insertion into the main video program.

The classification identifier may comprise at least one of subject information for the video signal, subject information for the overlay content, priority information for an existing insertion window, characteristics of an insertion window, audio override information for the overlay content, a resolution of the overlay content, a channel number, a target program name for insertion of the overlay content, a regional program rating of the target program, a transport identifier for the target program, a format descriptor, a text component descriptor comprising at least one of text position, speed, font size, font type, and font color, and a video component descriptor comprising at least one of a video resolution, a video position, a video speed for animation, or the like.

The selection process can be further optimized in cases where an opportunity for insertion has been signaled, and more than one suitable overlay content signal exists. For example, in addition to pre-assigning one or more classification identifiers to each overlay content signal, "quality of fit" parameters could be pre-assigned to the overlay content signals as well. That is, for each classification identifier, there may be a corresponding quality of fit parameter that is indicative of the relevance of the content to the particular classification. Then, if there are multiple overlay content signals featuring the same classification identifier, and if this identifier matches the one specified in the tag included in a main video stream, then the overlay content signal having the highest corresponding quality of fit parameter would be selected. This method can be used to maximize the efficiency of targeted advertising when using partial screen video insertions.

In an example embodiment using both classification identifiers and quality of fit parameters, a tag may be appended to both the video signal (e.g., at tagging processor 29) and each of the one or more overlay content signals (e.g., at overlay content generator 26). Classification identifiers may be provided as at least part of the identifying information. A corresponding quality of fit parameter may be assigned to the overlay content signal (e.g., at overlay content generator 26) for each classification identifier. The quality of fit parameter may indicate a relative correspondence between each overlay content and the classification identifier. In such an example embodiment, the overlay content signals that have the same classification identifier as the video signal may be identified by the video processor 28. The video processor 28 may then select the overlay content from an identified overlay content signal that has a quality of fit parameter that indicates a highest correspondence to the classification identifier.

The overlay content generator 26 may be located at a central distribution site. The video processor 28 may be located at a location remote from the overlay content generator 26. Multiple video processors 28 may be provided at respective remote locations, such as, for example various downstream sites such as a cable or satellite headend or hub, a telephone company central office or node, or the like. The overlay content signals may be forwarded from the overlay content generator 26 to at least one video processor 28 at a corresponding remote location for storage in advance of the inserting. For example, a video processor 28 may be located at one of a cable headend, a central office, a cable distribution hub, a satellite distribution hub, or the like. In such instances, the identifying information contained in the tags may comprise geographic information. The video processor 28 at a particular remote location may select the overlay content from the overlay content signals having geographic information corresponding to the particular remote location of that video processor 28 for insertion in the video signal. For example, the tag may be used to match the overlay content signal with a particular geographic region. Each video processor 28 could then compare the tag with a pre-assigned region code that is specific to the location of each respective video processor location. In this way, it becomes possible to create a different message for each video processor 28 since the video processors are now able to scan all messages to find the one most suitable for the local audience.

The selection and inserting of the overlay content may occur at the at least one remote location by respective video processors 28 at those locations. Alternatively, the selection and inserting of the overlay content may occur by a video processor 28 at a central location. Multiple copies of the modified video content may then be distributed from the central location to one or more remote locations for further distribution.

The tag may be appended to the overlay content signal by the overlay content generator 26 at the central distribution site. This tag may determine which of the one or more video processors 28 at respective remote locations will insert the overlay content in a particular video stream.

Figure 3:
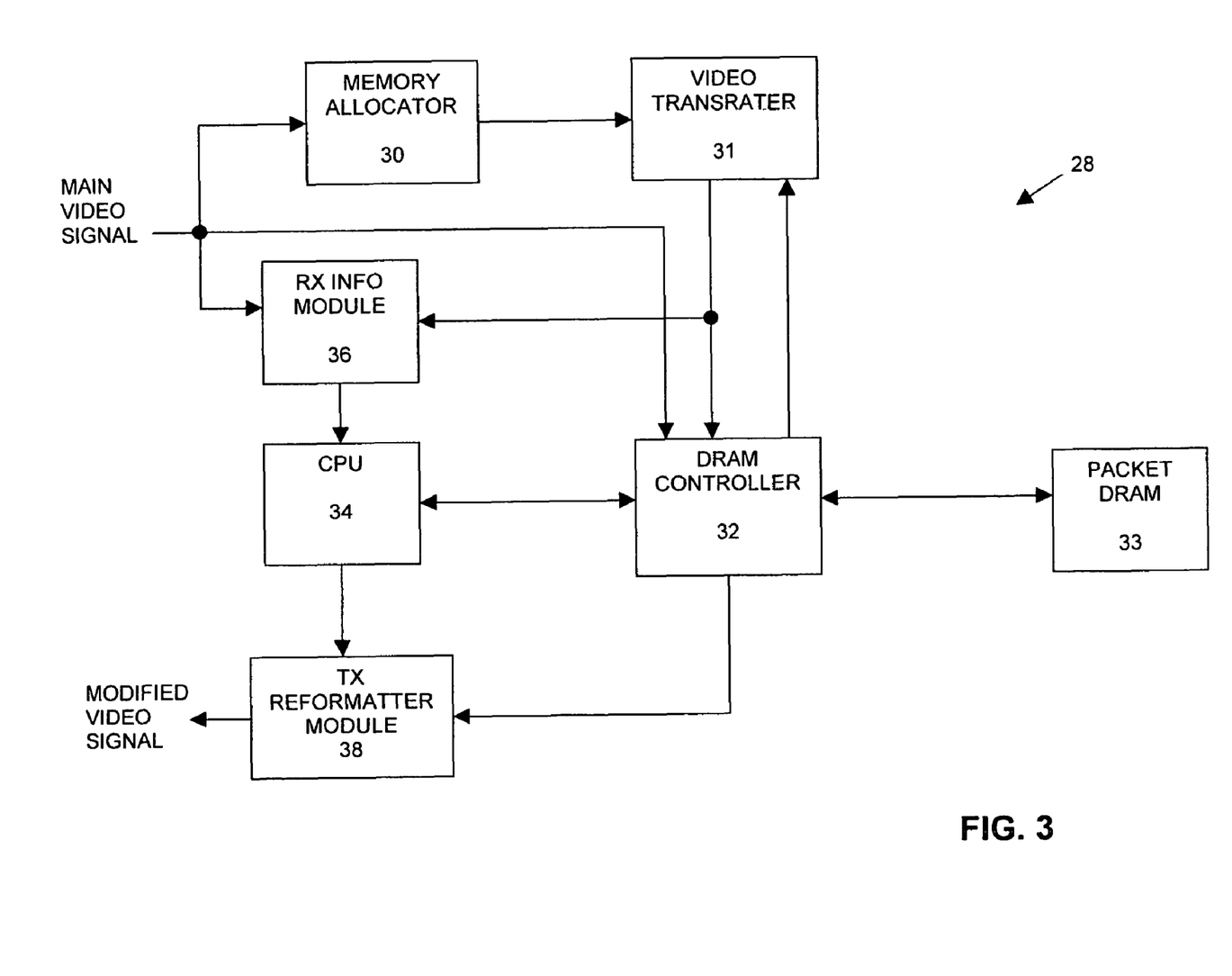
FIG. 3 shows a block diagram of an example embodiment of a video processor in accordance with the present invention.

The video processor may insert the overlay content signal into an insertion window of the video signal in place of a corresponding portion of the video signal. Alternatively, the overlay content may be inserted into an insertion window of the video signal and blended with a corresponding portion of the video signal. Alpha blending may be used to blend the overlay content with a corresponding insertion window portion of the video signal An example embodiment of a video processor 28 in accordance with the present invention is shown in FIG. 3. The example embodiment of a video processor 28 shown in FIG. 3 includes an optional memory allocator 30 and optional video transrater 31 for enabling modification of the data rate of the video stream at the same time as the insertion of overlay content takes place. Those skilled in the art will appreciate that the video processor 28 may be implemented without the transrating capabilities provided by the optional memory allocator 30 and optional video transrater 31 where insertion of overlay content is desired without any modification of the data rate of the resultant modified video stream. Alternatively, the video transrater 31 may be instructed to maintain the original data rate of the video signal.

In an example embodiment where transrating is desired, incoming packets of the video signal (e.g., either video signals from the video sources 21, 22, 24, and/or 25, or the overlay content signals from the overlay content generator 26 of FIG. 2) are scanned by the memory allocator 30 for header information specifying the horizontal and vertical dimensions of the encoded image. This information may be needed by the video transrater 31 if provided with memory for storing one or more images of each incoming video signal. In addition to optional memory space for the individual video signals, transrater 31 also includes memory for the overlay content which is to be inserted or overlayed on top of the video signal. An example of a prior art memory allocator is described in U.S. Pat. No. 7,046,677.

The incoming video packets are not sent directly to the video transrater 31 but are first deposited into packet dram 33 via the dram controller 32. A central processing unit (CPU) 34 is notified of the arrival of each packet by depositing a tag into the rx info module 36, which is in communication with the CPU 34. The tag identifies the packet and the CPU 34 maintains a list matching the address in packet dram 33 with information corresponding to the received packet.

Although the video transrater 31 is capable of processing multiple video streams, they must first be organized into complete frames and multiplexed at the boundaries between frames. The CPU 34 keeps track of the sequence of packets comprising each frame and determines the sequence in which frames are to be forwarded from packet dram 33 to the video transrater 31. The CPU 34 instructs the dram controller 32 to forward the selected packets from packet dram 33 to the video transrater 31 in the desired sequence.

In addition to adjusting the data rate of each stream, the video transrater 31 may also implement the insertions and overlays. The CPU 34 may analyze the identifying information contained in the tags deposited into the rx info module 36 to determine whether a particular video stream has an insertion window available for the insertion of overlay content. Once an insertion opportunity is identified in a particular video stream, the CPU may select a particular overlay content for insertion based on the identifying information contained in the tags of the overlay content and/or the video stream, as discussed in detail above. The CPU 34 may then direct dram controller 32 to provide the appropriate packets from packet dram 33 to the transrater 31. For example, the CPU 34 may direct dram controller 32 to provide the transrater 31 with packets from packet dram 33 corresponding to the overlay content that has been matched with a particular video stream. The transrater 31 may use various alpha blending techniques to blend the overlay content with the corresponding insertion window portion of the video signal.

Those skilled in the art will appreciate that in embodiments where transrating is not required, a suitable processor may be substituted in place of the memory allocator 30 and video transrater 31 for implementing the insertions and overlays.

Once the frames have been processed by the video transrater 31, the resulting sequence of packets (e.g., transrated packets and/or modified packets containing overlay content) is returned to packet dram 33 via the dram controller 32. At the same time, the CPU 34 is notified of each packet transfer. This is done by again depositing the tag into the rx info module 36 so that the CPU 34 again becomes aware of the location of each packet in the packet dram 33. In this case the tag is provided by the transrater 31 to the rx info module 36. If the CPU 34 requires additional information about a particular video stream, then it may submit a request to the dram controller 32 in order to receive the data comprising any selected packet.

The CPU 34 also manages the sequencing and formatting of packets for final output. Statistical multiplexing schemes are easily implemented by managing the transrating process to achieve similar video quality on each stream while utilizing the full capacity of the output channel. The CPU 34 manages the formation of the output multiplex by instructing the dram controller 32 to transfer selected packets from packet dram 33 to the tx reformatter module 38. In this case, the CPU 34 may also have the ability to modify the header (including tags) of each packet as it passes through the tx reformatter module 38.

The pre-conditioning of the video streams or overlay content streams with tags may be done by modifying existing protocols such as the SCTE-30 and SCTE-35 protocols currently used for implementing full screen digital ad insertions.

The same overlay content can be sent with different resolutions if the main video signal is being transmitted with different resolutions at different times. For example, "resolution" can be one of the parameters in determining "quality of fit" or alternatively, different Classification IDs can be assigned for different resolutions.

The same method can be extended for use with DPI (Digital Program Insertion), in a sense that the video transmitted by DPI servers could become the "Main Video" signal during that time window. In such cases, the system which provides the splicing functionality (or DPI server itself) could insert the tags, and classification IDs can be used to insert or overlay content for targeted advertising. In such a way DPI servers can leverage the present invention's capabilities without having to modify ad content itself. This gives the flexibility to a small headend to just overlay or insert on specific portions of ad content, which was originally transmitted by larger headends.

Subject classification pertaining to the main program can leverage from already existing characteristics of a program. For example, ATSC systems can use a combination of parameters available at its disposal, for example major and minor channel number, program name, regional rating of a program, transport IDs and the like.

Targeted advertising can be achieved by inserting an event sponsor's overlay content at a particular time. If an event/segment has many sponsors, subject information can use the same classification ID for all of them but with different "Quality of fit" parameters. Of course "Quality of fit" parameters could be dynamically changed if an application wants to rotate among the inserted overlay content of all the sponsors at different times.

Overlay content signals may be transmitted to the video processor 28 over a variety of different transport protocols. If the overlay content happens to be a sub-window featuring full-motion video, bandwidth and storage requirements might become critical. In such cases it might be easier to transmit such data over MPEG-2 transport protocol, at a time closer to the actual insertion time.

The overlay content generator 26 may also be enabled to make a decision as to when and where the overlay content will be inserted. This gives the overlay content generator 26 the flexibility to overlay the main video signal at anytime without having to wait and depend on the tags in the main video program. Alternatively, flags can be provided in the overlay content signal header to override any of the tags in the main video program. This ability may be advantageous for emergency alert applications where overlay signals, consisting of text messages, are to have priority over all video programs. In this case the overlay content signal header could provide the information, such as insertion time, position, size, etc. Other parameters can be modified for each overlay content, such as opacity.

Figure 4:
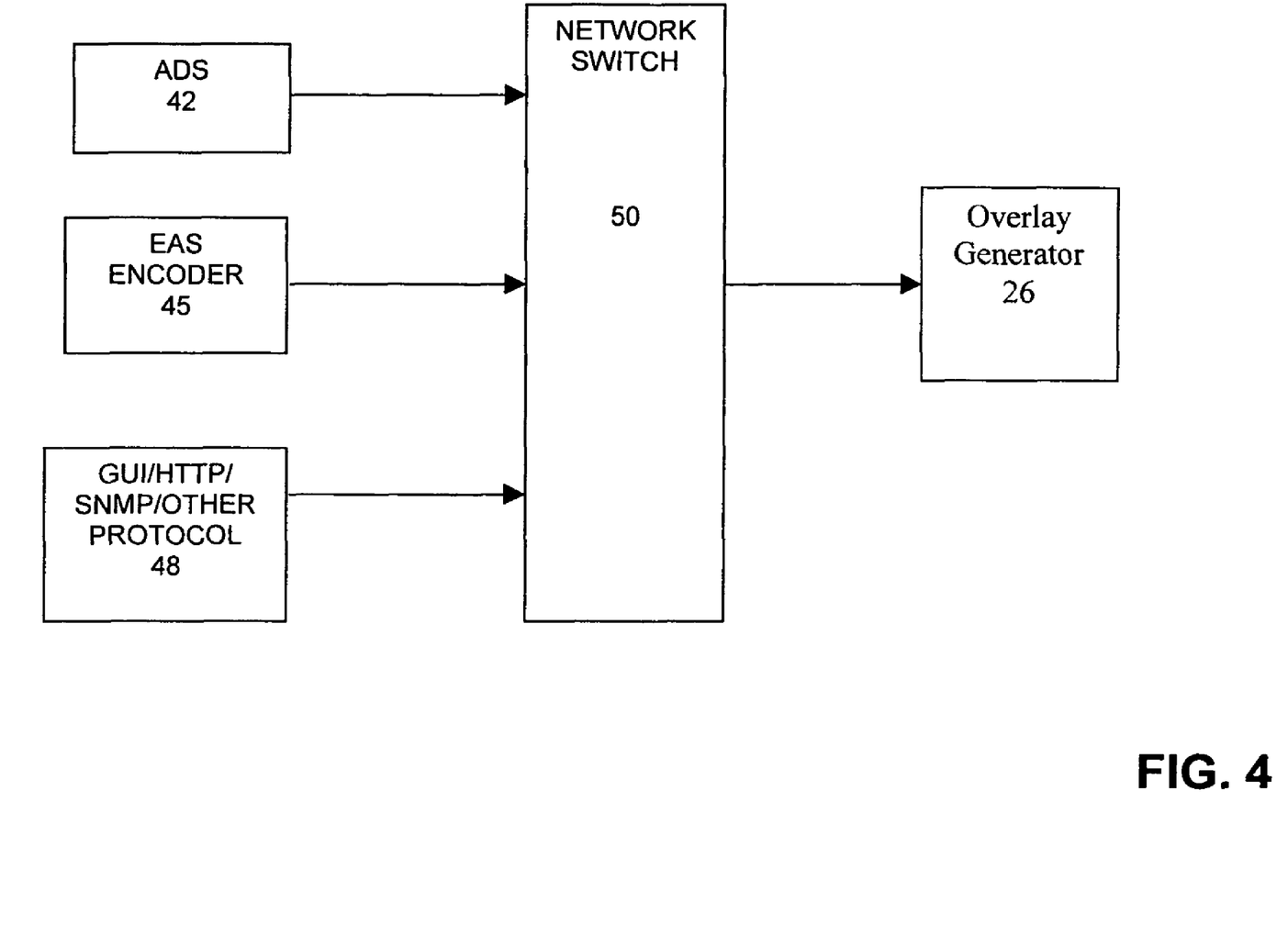
FIG. 4 shows a block diagram of a system for triggering the insertion of overlay content in accordance with an example embodiment of the present invention.

FIG. 4 shows a block diagram of a system for triggering the insertion of overlay content by overlay generator 26 in accordance with an example embodiment of the present invention. There are multiple ways to trigger the insertion of overlay content, as will be apparent to those skilled in the art. FIG. 4 shows only some of the examples. Overlay insertion may be signaled by an Ad Decision System (ADS) module 42 using, for example, DVS 629 protocol. DVS 629 is a standard under development by the Society of Cable Telecommunications Engineers (SCTE) Digital Video Subcommittee (DVS). The ADS module 42 can use DVS 629 protocol to communicate with the overlay generator 26 via a network switch 50. The ADS 42 can send profile aware overlay content to overlay generator 26. In this way, targeted advertisement can be provided. In other words, for the same network or ad content, different viewers can be provided with different overlay content (e.g., based on viewer profiles, demographics, viewing times, viewing regions, or the like).

Emergency Alert System (EAS) encoder module 45 may employ, for example, SCTE 18 (an SCTE standard) protocol to send emergency alert messages to the overlay generator 26 via network switch 50. In this way, the EAS encoder module 45 can trigger a text overlay to an existing video network.

The overlay generator 26 can also take other forms of protocol, like GUI, HTTP, SNMP and the like, from module 48 via network switch 50. Accepting overlay content in various protocols enables live quick updates on overlay text or graphics, which can make the commercial application of overlay content insertion a real-time application.

Those skilled in the art will appreciate that other effects can also be given to the overlayed content in accordance with the present invention.

It should now be appreciated that the present invention provides advantageous methods, apparatus, and systems for managing the insertion of overlay content into a video signal, and for transrating video signals which have insertion and overlay capabilities.

Although the invention has been described in connection with various illustrated embodiments, numerous modifications and adaptations may be made thereto without departing from the spirit and scope of the invention as set forth in the claims.

What is claimed is:

1. A method for inserting overlay content into a video signal to provide a modified packetized bit stream containing both video and overlay content for subsequent transmission to a receiver, comprising:
   receiving a compressed bit stream carrying a video signal from a video source;
   providing overlay content in one or more overlay content signals; and
   inserting overlay content selected from one of said one or more overlay content signals into an insertion window of said video signal, without decoding the compressed bit stream, to produce said modified packetized bit stream, said overlay content being carried in a payload portion of said modified packetized bit stream together with video content from said video signal;
   wherein the modified packetized bit stream is a single program bit stream containing both the video and overlay content for transmission to and decoding at the receiver.

2. A method in accordance with claim 1, further comprising:
   appending a tag containing identifying information to both the video signal and each of said one or more overlay content signals.

3. A method in accordance with claim 2, wherein said overlay content is selected from one of said one or more overlay content signals by:
   extracting the tags from the video signal and each of said one or more overlay content signals;
   comparing the tag from the video signal with each tag from the overlay content signals;
   selecting for insertion the overlay content from the overlay content signal which has the tag that is a best match to the tag extracted from the video signal.

4. A method in accordance with claim 2, wherein:
   said identifying information comprises at least one of: (1) geographic information identifying the geographic region where the overlay content is to be inserted into the video signal; (2) a downlink control device identifier; (3) a destination QAM; (4) a channel number; (5) an insertion start time; (6) a duration of overlay content; (7) an insertion identifier; (8) an insertion window position; (9) an insertion window size; (10) a classification identifier; (11) blending information; and (12) key words to enable matching of the overlay content with the video signal.

5. A method in accordance with claim 4, wherein said classification identifier comprises at least one of subject information for the video signal, subject information for the overlay content, priority information for an existing insertion window, characteristics of an insertion window, audio override information for said overlay content, a resolution of the overlay content, a channel number, a target program name for insertion of said overlay content, a regional program rating of said target program, a transport identifier for said target program, a format descriptor, a text component descriptor comprising at least one of text position, speed, font size, font type, and font color, and a video component descriptor comprising at least one of a video resolution, a video position, and a video speed for animation.

6. A method in accordance with claim 1, further comprising:
   appending a tag containing identifying information to both the video signal and each of said one or more overlay content signals;
   providing classification identifiers as at least part of said identifying information;
   assigning a corresponding quality of fit parameter to said overlay content signal for each classification identifier, said quality of fit parameter indicating a relative correspondence between each overlay content and said classification identifier; and
   identifying said overlay content signals which have the same classification identifier as the video signal;
   wherein said overlay content is selected from the identified overlay content signal which has a quality of fit parameter that indicates a highest correspondence to said classification identifier.

7. A method in accordance with claim 2, wherein:
   the overlay content signals are generated at a central distribution site.

8. A method in accordance with claim 7, wherein:
   the overlay content signals are forwarded to at least one remote location for storage in advance of said inserting.

9. A method in accordance with claim 8, wherein said remote location comprises one of a cable headend, a central office, a cable distribution hub, and a satellite distribution hub.

10. A method in accordance with claim 8, wherein:
    said identifying information comprises geographic information; and
    the overlay content signals having geographic information corresponding to a particular remote location are selected for insertion at that particular remote location.

11. A method in accordance with claim 8, wherein:
    the selection and inserting of the overlay content occurs at said at least one remote location.

12. A method in accordance with claim 8, wherein:
    the tag is appended to the overlay content signal at the central distribution site and determines which of one or more remote locations will insert the overlay content in a particular video stream.

13. A method in accordance with claim 1, wherein:
    the selection and inserting of said overlay content occurs at a central location; and
    the modified video content is distributed from the central location to one or more remote locations for further distribution.

14. A method in accordance with claim 1, wherein said overlay content signal is inserted into said insertion window of said video signal in place of a corresponding portion of said video signal.

15. A method in accordance with claim 1, wherein said overlay content is inserted into said insertion window of said video signal and blended with a corresponding portion of said video signal.

16. A method in accordance with claim 1, further comprising:
    triggering the insertion of said overlay content from an external source.

17. A method in accordance with claim 16, wherein said external source comprises one of an Emergency Alert System and an Ad Decision System.

18. A system for inserting overlay content into a video signal to provide a modified packetized bit stream containing both video and overlay content for subsequent transmission to a receiver, comprising:
    a network switch for receiving a compressed bit stream carrying a video signal from a video source;
    an overlay generator for providing overlay content in one or more overlay content signals to said network switch;

a video processor in communication with said network switch, said video processor being adapted for:
selecting overlay content from one of said one or more overlay content signals; and
inserting the selected overlay content into an insertion window of said video signal, without decoding the compressed bit stream to produce said modified packetized bit stream, said overlay content being carried in a payload portion of said modified packetized bit stream together with video content from said video signal;
wherein the modified packetized bit stream is a single program bit stream containing both the video and overlay content for transmission to and decoding at the receiver.

19. A system in accordance with claim 18, comprising:
tagging means for appending a tag containing identifying information to at least one of:
(a) the compressed bit stream,
(b) one or more of said overlay content signals,
wherein:
said tagging means for the compressed bit stream comprises a tagging processor for appending a tag to the video signal; and
said tagging means for the one ore more overlay content signals comprise said overlay generator, which appends said tags to said one ore more overlay content signals.

20. A system in accordance with claim 19, wherein tags are appended to the video signal and each of said one or more overlay content signals, and said video processor comprises:
means for extracting the tags from the video signal and each of said one or more overlay content signals;
means for comparing the tag from the video signal with each tag from the overlay content signals;
means for selecting for insertion the overlay content from the overlay content signal which has the tag that is a best match to the tag extracted from the video signal.

21. A system in accordance with claim 19, wherein:
said identifying information comprises at least one of: (1) geographic information identifying the geographic region where the overlay content is to be inserted into the video signal; (2) a downlink control device identifier; (3) a destination QAM; (4) a channel number; (5) an insertion start time; (6) a duration of overlay content; (7) an insertion identifier; (8) an insertion window position; (9) an insertion window size; (10) a classification identifier; (11) blending information; and (12) key words to enable matching of the overlay content with the video signal.

22. A system in accordance with claim 21, wherein said classification identifier comprises at least one of subject information for the video signal, subject information for the overlay content, priority information for an existing insertion window, characteristics of an insertion window, audio override information for said overlay content, a resolution of the overlay content, a channel number, a target program name for insertion of said overlay content, a regional program rating of said target program, a transport identifier for said target program, a format descriptor, a text component descriptor comprising at least one of text position, speed, font size, font type, and font color, and a video component descriptor comprising at least one of a video resolution, a video position, and a video speed for animation.

23. A system in accordance with claim 19, wherein:
said tagging processor appends tags to the video signal and each of said one or more overlay content signals;
said identifying information comprises a classification identifier;
the overlay generator assigns a corresponding quality of fit parameter to said overlay content signal for each classification identifier, said quality of fit parameter indicating a relative correspondence between each overlay content and said classification identifier;
said video processor identifies the overlay content signals which have the same classification identifier as the video signal; and
said video processor selects said overlay content from the identified overlay content signal which has a quality of fit parameter that indicates a highest correspondence to said classification identifier.

24. A system in accordance with claim 19, wherein:
the overlay generator is located at a central distribution site.

25. A system in accordance with claim 24, wherein:
at least one video processor is provided at a respective remote location;
the overlay content signals are forwarded to at least one remote location for storage in advance of said inserting.

26. A system in accordance with claim 25, wherein said remote location comprises one of a cable headend, a central office, a cable distribution hub, and a satellite distribution hub.

27. A system in accordance with claim 25, wherein:
said identifying information comprises geographic information; and
said video processor at a particular remote location selects the overlay content from the overlay content signals having geographic information corresponding to said particular remote location for insertion in the video signal.

28. A system in accordance with claim 25, wherein:
the selecting and inserting occurs at said remote location.

29. A system in accordance with claim 25, wherein:
the tag is appended to the overlay content signal at the central distribution site and determines which of one or more remote locations will insert the overlay content for insertion in a particular video stream.

30. A system in accordance with claim 18, wherein:
said selecting and inserting of said overlay content occurs at a central location; and
the modified video content may be distributed from the central location to one or more remote locations for further distribution.

31. A system in accordance with claim 18, wherein said overlay content signal is inserted into said insertion window of said video signal in place of a corresponding portion of said video signal.

32. A system in accordance with claim 18, wherein said overlay content is inserted into said insertion window of said video signal and blended with a corresponding portion of said video signal.

33. A system in accordance with claim 18, further comprising:
an external source for triggering the insertion of said overlay content by the overlay generator.

34. A system in accordance with claim 33, wherein said external source comprises one of an Emergency Alert System and an Ad Decision System.

* * * * *

UNITED STATES PATENT AND TRADEMARK OFFICE
CERTIFICATE OF CORRECTION

| | | |
|---|---|---|
| PATENT NO. | : 8,087,044 B2 | Page 1 of 1 |
| APPLICATION NO. | : 11/881208 | |
| DATED | : December 27, 2011 | |
| INVENTOR(S) | : Krause et al. | |

It is certified that error appears in the above-identified patent and that said Letters Patent is hereby corrected as shown below:

IN THE CLAIMS:

Column 13, line 24, claim 19: "said tagging means for the one ore more overlay content" should read
-- said tagging means for the one or more overlay content --

Column 13, line 26, claim 19: "said tags to said one ore more overlay content signals." should read
-- said tags to said one or more overlay content signals. --

Signed and Sealed this
Seventh Day of February, 2012

David J. Kappos
*Director of the United States Patent and Trademark Office*